(No Model.)
M. RUGGLES.
COOKING ATTACHMENT FOR HEATING STOVES.
No. 352,488. Patented Nov. 9, 1886.
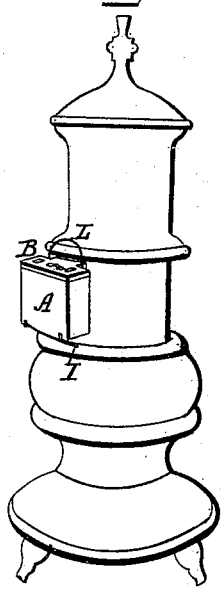
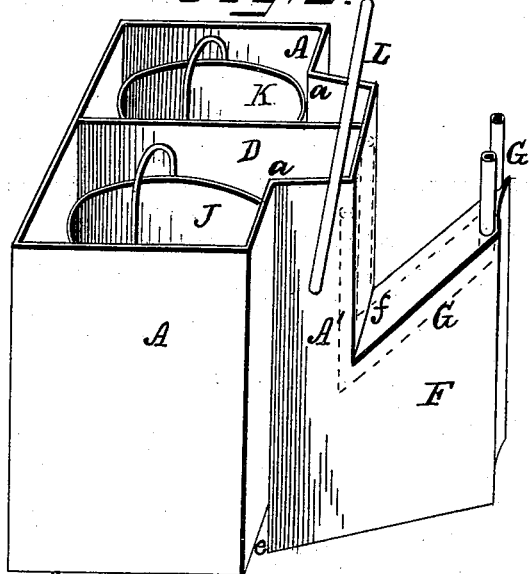
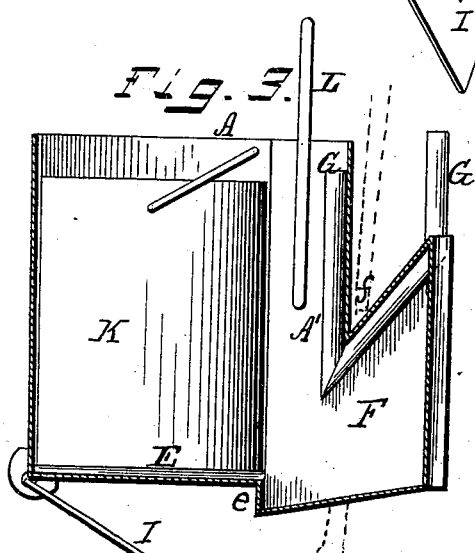
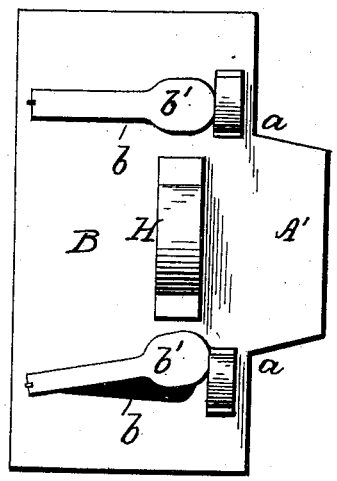
Witnesses
Douglass S. Mackall
Harvey S. W. Gaw
Inventor
Mary Ruggles
per Henry Wise Garnett
Atty.
N. PETERS, Photo-Lithographer, Washington, D. C.

UNITED STATES PATENT OFFICE.

MARY RUGGLES, OF SARATOGA SPRINGS, NEW YORK.

COOKING ATTACHMENT FOR HEATING-STOVES.

SPECIFICATION forming part of Letters Patent No. 352,488, dated November 9, 1886.

Application filed June 8, 1886. Serial No. 204,480. (No model.)

*To all whom it may concern:*

Be it known that I, MARY RUGGLES, a citizen of the United States, residing at Saratoga Springs, in the county of Saratoga and State of New York, have invented certain new and useful Improvements in Cooking Attachments for Heating-Stoves; and I do hereby declare the following to be a full, clear, and exact description of the invention, such as will enable others skilled in the art to which it appertains to make and use the same.

My invention is an improvement in cooking attachments for stoves; and it consists in certain details of construction and arrangement of the parts composing the said attachment, whereby the several operations of boiling or steaming vegetables and other forms of food may be performed upon an ordinary base-burning heating-stove, to which form of stove my attachment is particularly adapted.

The object of this invention is to provide housekeepers of limited means and accommodations with such a contrivance as will embrace in compact form the several utensils usually employed to perform the operations of boiling or steaming meats, vegetables, &c., and be adapted for use upon the form of heating-stove most commonly in use—i. e., the magazine base-burning heating-stove. To accomplish this I proceed as follows, reference now being had to the accompanying drawings for a better understanding of the details of construction and arrangement of the parts composing my invention, and in which drawings—

Figure 1 represents a view in perspective of a parlor base-burning heating-stove having my attachment or steamer applied thereto. Fig. 2 is a view in perspective, on an enlarged scale, of the attachment and with its cover removed therefrom; Fig. 3, a vertical transverse sectional elevation illustrating the position of the attachment when applied to a stove, a portion of the wall of which stove is shown in dotted lines; and Fig. 4, a plan view of the same.

A A represent the main body of the attachment, which is made close and water-tight, and with a removable lid, B, and removable partition D. This body A, at the central rear portion thereof, has an offset, as at A', forming a right-angled shoulder to the rear wall, as at *a*. This offset, as shown in Figs. 2 and 3, is also made water-tight, and extends below the general bottom E of the body and forms an angular shoulder, as at *e*, Fig. 3. A portion, as at F, of this offset A' continues rearward and at an upward inclination, as seen in Figs. 2 and 3, whereby a crotch, as at *f*, is formed, for the purposes as will hereinafter appear.

G G are pipes extending from near the top of the offset A' downward and around the crotch *f*, and terminating slightly above the top of the part F, for the purposes of carrying off the steam, &c., from the cooking articles and boiling water in the vessel and discharging the same into the stove, so that all unpleasant odors are prevented from entering the room. The objection, therefore, to the use of this class of devices because of said odors is overcome by my invention.

In the lid B are formed openings *b*, controlled by slides *b'*, as seen in Fig. 4, for regulating the temperature within the attachment.

H is a handle for lifting the lid B, and I is a brace or bracket hinged to the front bottom edge of the body A, for supporting the same at its front. This completes the construction of the attachment.

When desired for use, one or more pails or vessels, as at J K, containing the vegetables, &c., are placed in the body A, as seen in Fig. 2, and said body partially filled with water, as seen in Fig. 3. The lid B is then placed thereon and the attachment is ready for use.

To use the attachment, the door of the stove is opened and the rear portion, F G, of said attachment inserted through the opening into the stove until the angular part *a a*, Fig. 2, rests against the face of the stove. The part F will then be wholly within the stove, over the burning coals, and in close proximity to the magazine, if there be such, for the dimensions of the parts are such as to accomplish this. The heat of the fire will therefore be applied directly to both the bottom and rear side of the vessel, which will quickly heat the water contained therein, which in turn cooks the contents of the separate vessels, J K, &c. The steam, &c., as it is formed enters the pipes G and is carried into the stove and there consumed. Should the heat be too great, a more or less adjustment of the slides *b'* will permit air to enter the openings and pass into the stove, and thereby reduce the temperature. The bracket I, resting upon the edge of the stove, supports the vessel at its front; but the escape or falling of the same is prevented by reason of the crotch $f$, into which the top edge of the stove-door opening is received when placing the attachment in position, and is adapted to fit for the purpose of supporting said attachment in its proper position. This bracket I also forms a convenient handle in connection with the bail L, Figs. 2 and 3, whereby the attachment may be handled and adjusted to and removed from the stove.

Having thus fully described my invention, its operation, advantages, &c., what I claim as new therein and of my invention, and desire to secure by Letters Patent of the United States, is as follows, viz:

1. The vessel A, formed with a central offset, A', and lateral extension F, having an upward inclination to form a crotch, $f$, for supporting the same within the doorway of heating-stoves, as described and shown.

2. In combination with the water-tight vessel A, formed with central offset, A', and lateral extension F, the pipes G, substantially as and for the purposes described and shown.

3. In combination with the water-tight vessel A, formed with central offset, A', and lateral extension F, having an upward inclination, the bracket or support I, hinged to the lower edge of the body A, for the purposes specified.

4. The combination, with the water-tight vessel A, formed with central offset, A', and lateral extension F, of the lid B, with openings $b$ therein and slides $b'$, substantially as and for the purposes described.

5. The combination, with the water-tight vessel A, formed with a central offset, A', and lateral extension F, of the pipes G and removable partition D, substantially as and for the purposes described and shown.

MARY RUGGLES.

Witnesses:
WILLARD LESTER,
MARTIN CROOKS.